Figure 3:
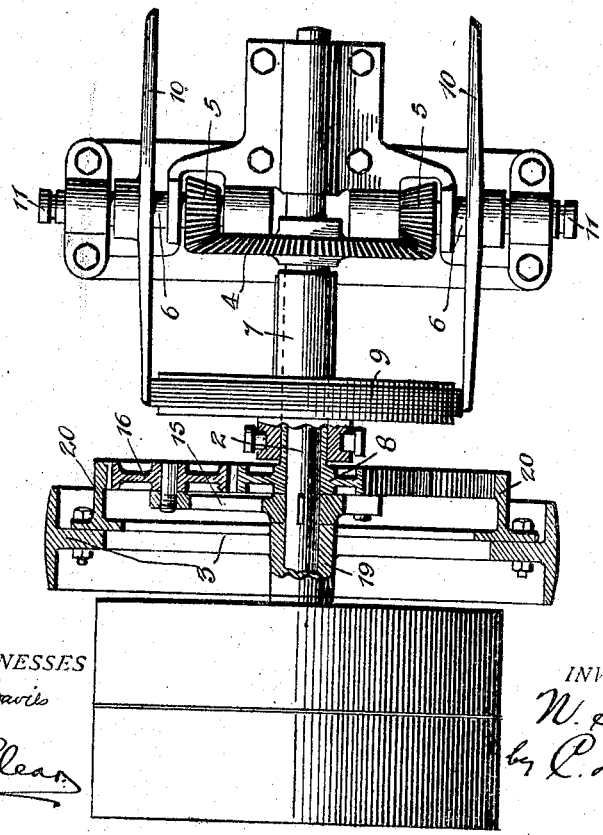

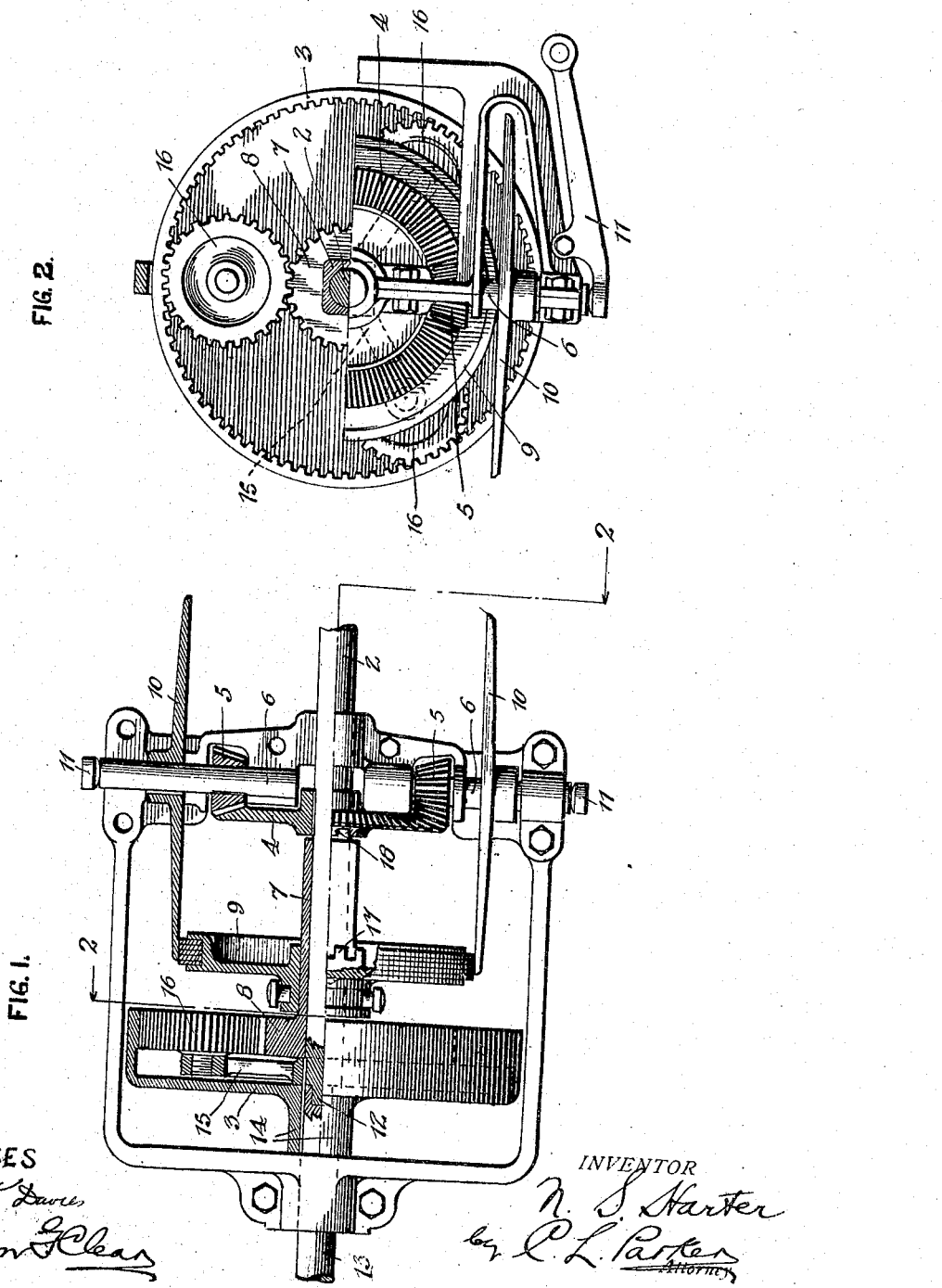

N. S. HARTER.
VARIABLE SPEED AND REVERSING MECHANISM.
APPLICATION FILED DEC. 2, 1907.

899,974.

Patented Sept. 29, 1908.
2 SHEETS—SHEET 2.

WITNESSES
INVENTOR

UNITED STATES PATENT OFFICE.

NOAH S. HARTER, OF WAUKEGAN, ILLINOIS.

VARIABLE-SPEED AND REVERSING MECHANISM.

No. 899,974.

Specification of Letters Patent.

Patented Sept. 29, 1908.

Application filed December 2, 1907. Serial No. 404,689.

*To all whom it may concern:*

Be it known that I, NOAH S. HARTER, a citizen of the United States, residing at Waukegan, in the county of Lake and State of Illinois, have invented certain new and useful Improvements in Variable - Speed and Reversing Mechanism, of which the following is a specification.

My invention relates to a variable speed and reversing mechanism and has for its object to provide a simple and efficient device for the purpose of transmitting power from one point to another at any desired speed and in either direction, forward or reverse, and whereby the regulation of the speed and the direction of rotation may be conveniently governed by means of a single lever.

With these and other objects in view my invention specifically resides in the following features of construction, arrangement and operation to be hereinafter described with reference to the accompanying drawings, forming a part of this specification, in which like numerals are used to designate like parts throughout the several figures, and in which, Figure 1 is an elevation, partly in section, illustrating a variable speed and reversing mechanism, constructed in accordance with my invention, and particularly designed for employment in connection with motor vehicles, having axially alined driving and driven shafts, Fig. 2 is a sectional view taken therethrough on the line 2—2 of Fig. 1, and Fig. 3 is an elevation partly in section of my improved mechanism employed in connection with a pulley shaft.

In the practical embodiment of my invention, I provide mechanism comprising a driving shaft 2 preferably concentric with the driven member 3 in whatever form the latter may be employed, said driving member being provided with a bevel gear 4 meshing with bevel gears 5 mounted upon short shafts 6 suitably journaled at right angles to said shaft 2. The driving shaft or member 2 is suitably connected by planetary gearing to the driven member, which gearing and connection will be hereinafter specifically described, and said shaft 2 is further provided with a sleeve 7 rotatively mounted thereon, carrying a pinion 8 at one end thereof suitably engaging within the planetary gearing connecting said driving and driven members 2 and 3. Splined upon the sleeve 7 is a friction wheel 9 to slide thereon under actuation of a suitable lever or the like and engaging the faces of friction disks 10 mounted upon the short shafts 6 beyond their bevel gears 5.

From the foregoing description generic to all the figures it may be stated that the driven member 3 is rotated directly from the driving member 2 by the planetary gearing described, and that the friction gearing connecting with said planetary gearing as described, coöperates with the same to form a differential variable gearing which will be strong and durable and in which there will be a minimum of friction between the moving parts. Pivot levers 11 may be provided with one of their ends abutting the outer ends of the short shafts 6 in order to press the disks 10 into secure friction engagement with the friction wheel 9.

In the embodiment of my invention shown in Figs. 1 and 2 especially designed for use in connection with motor vehicles having axially alined driving and driven shafts, the end of the driving shaft or member 2 is provided with a stud 12 entering a recess in the end of the driven shaft 13 axially alined therewith. In this form, the driven member 3 is in the form of a casing continuously internally threaded within its outer portion and provided with a tubular inner portion 14 keyed upon the driven shaft 13, to in turn rotate the same. The end of the driving shaft 2 adjacent its stud 12 is provided with a spider 15 comprising a plurality of outstanding arms having gear wheels 16 journaled in the ends thereof and in engagement with the internally threaded portion of the driven member 3. The pinion 8 at one end of the sleeve 7 is of substantially the same size as the gear wheels 16 and engages therewith to connect the same with the friction gearing, as is clearly shown. In this form also, I provide the friction wheel 9 and the bevel gear 4 mounted on the driving shaft, with clutch faces 17 and 18, whereby the friction wheel 9 and the sleeve 7 may be driven directly from the driving shaft through its bevel gear 4.

In the form shown in Fig. 3 the mechanism is almost identical with that shown and described with relation to Fig. 1 with the exception that the driving shaft 2 is a one piece shaft and that the driven member 3 is in the form of a pulley wheel from which the power may be taken and is provided with a sleeve portion 19 loosely rotating upon said shaft 2, said pulley being provided with a flange ring 20 bolted thereto and internally threaded to be engaged by the gear wheels 16 journaled upon the ends of the arms of the spider 15. The operation of this form is identical with that of Fig. 1.

It will not be necessary to elucidate to any great extent the operation of the device shown and described, inasmuch as the same will be readily apparent to persons skilled in this art by reference to the accompanying drawings and the description thereof. It may, however, be here stated that the operation of the device shown in Fig. 3 is the same as that shown in Figs. 1 and 2, and that in each of these figures power is transmitted from the driving member to the driven member 3 through a planetary gear, the friction gearing being also driven from said driving member and connecting with said planetary gearing to coöperate therewith in differentially driving said driven member. From this it will be apparent that in one position of the friction wheel 9 which I will term a central position, the driving through the planetary gearing and through the friction gearing will be equalizing in their effect upon the driven member and the same will, consequently, remain stationary. When, however, the friction wheel 9 is moved in either direction from said central point the speed of the driven member will be correspondingly increased in either the forward or reverse drive.

Having thus fully described my invention, I claim:

1. In a variable speed and reversing mechanism, the combination of a driving member, a driven member concentric therewith and provided with a geared portion, planetary gearing carried by said driving member and engaging said geared portion of said driven member, shafts mounted adjacent and at right angles to said driving member, friction disks mounted upon said shafts, gearing connecting said driving member and said shafts, a sleeve loosely mounted upon said driving member between said shafts and said driven member, and provided with a geared portion engaging with said planetary gearing of said driving member, and a friction wheel splined upon said sleeve in engagement with said friction disks, substantially as described.

2. In a variable speed and reversing mechanism, the combination of a driving member, a driven member concentric therewith and provided with a geared portion, a plurality of gears mounted in a circular series about, and concentric with, said driving member, and engaging said geared portion of said driven member, connections between said driving member and said circular series of gears, shafts mounted adjacent and at right angles to said driving member, friction disks mounted upon said shafts, gearing connecting said driving member and said shafts, a sleeve loosely mounted upon said driving member between said shafts and said driven member, and provided with a geared portion to engage said circular series of gears, and a friction wheel splined upon said sleeve in engagement with said friction disks, substantially as described.

3. In a variable speed and reversing mechanism, the combination of a driving member, a driven member concentric therewith and provided with a geared portion, a plurality of gears mounted in a circular series about, and concentric with, said driving member, and engaging said geared portion of said driven member, connections between said driving member and said circular series of gears, shafts mounted adjacent and at right angles to said driving member, friction disks mounted upon said shafts, gearing connecting said driving member and said shafts, a sleeve loosely mounted upon said driving member between said shafts and said driven member, and provided with a geared portion to engage said circular series of gears, and a friction wheel splined upon said sleeve in engagement with said friction disks, said friction wheel having a notched portion adapted for engagement with a notched member of said gearing connecting said driving member and said transverse shafts, substantially as described.

In testimony whereof I affix my signature in presence of two witnesses.

NOAH S. HARTER.

Witnesses:
C. G. MARKS,
D. S. THOMSON.